(Model.)

4 Sheets—Sheet 1.

T. M. RICE.
AUTOMATIC GRAIN BINDER.

No. 267,936.    Patented Nov. 21, 1882.

Attest:
R. G. Barnes
L. H. Marshall

Inventor:
T. M. Rice by his atty
R. D. O. Smith

N. PETERS, Photo-Lithographer, Washington, D. C.

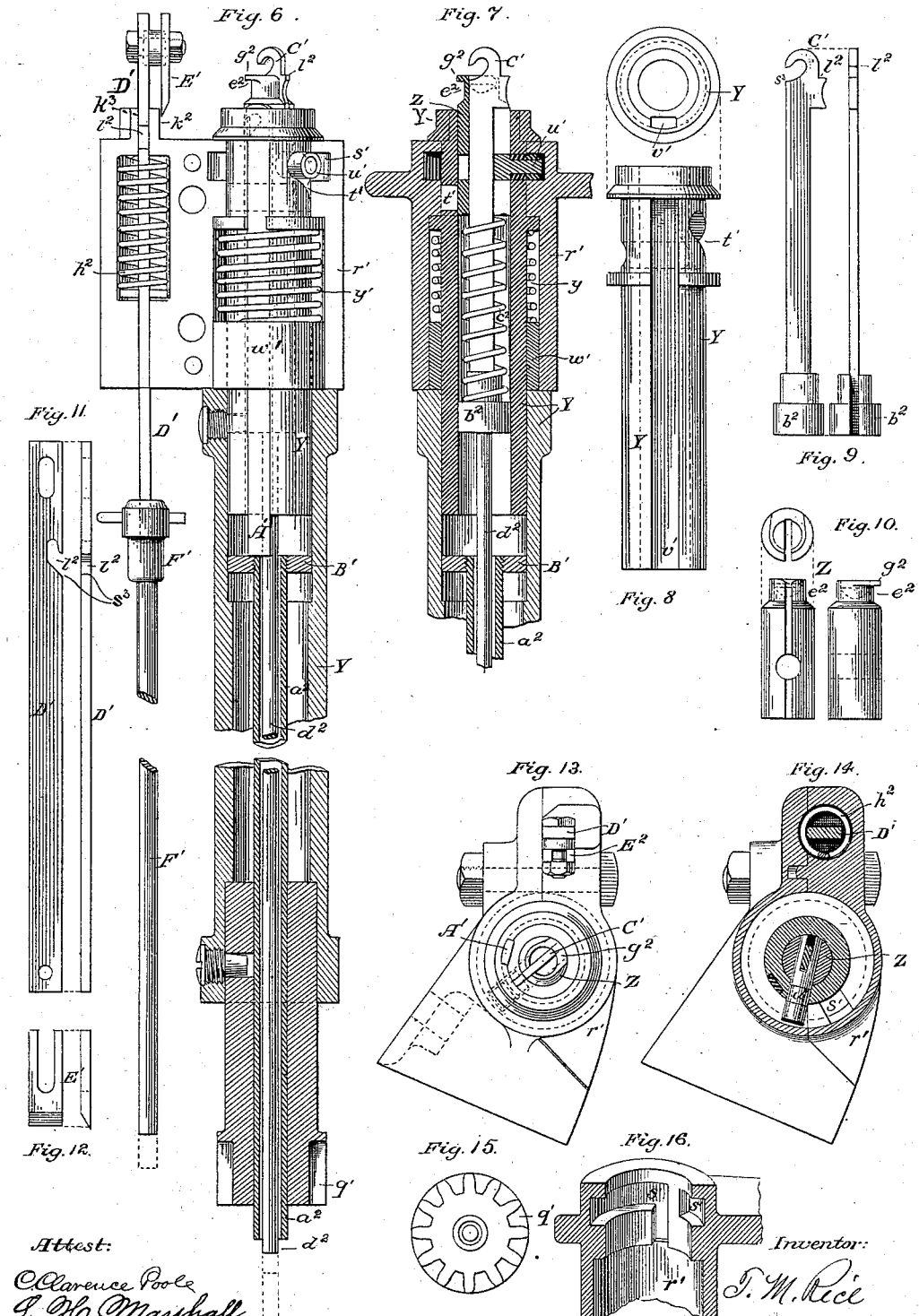

(Model.)

T. M. RICE.
AUTOMATIC GRAIN BINDER.

No. 267,936.   Patented Nov. 21, 1882.

Attest:
R. F. Barnes.
L. H. Marshall.

Inventor:
T. M. Rice
By his atty
R. D. O. Smith (Model.)
4 Sheets—Sheet 4.
T. M. RICE.
AUTOMATIC GRAIN BINDER.
No. 267,936. Patented Nov. 21, 1882.
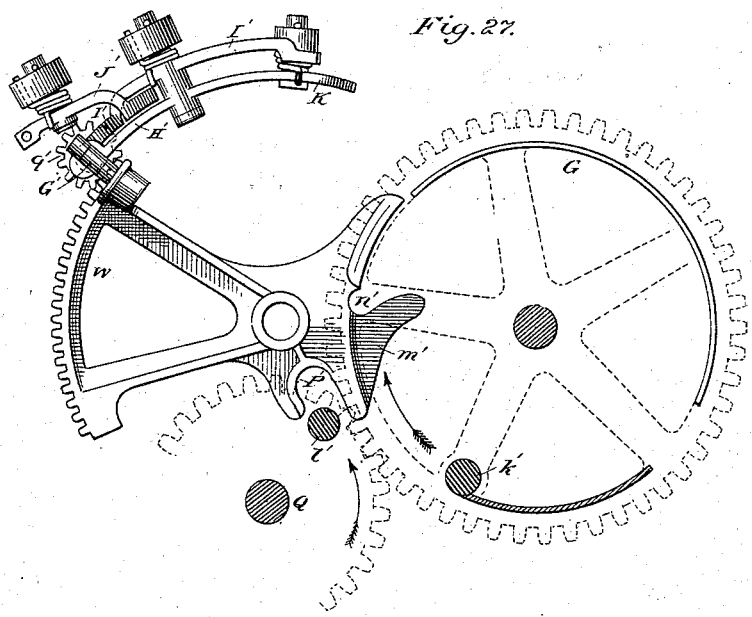
Fig. 27.
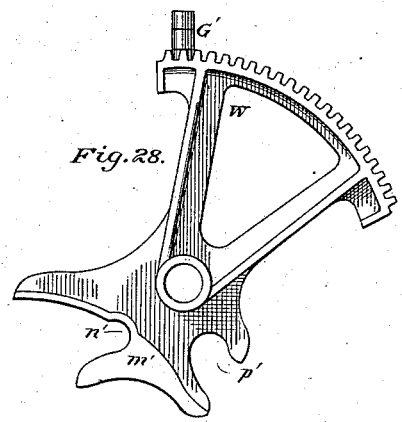
Fig. 28.
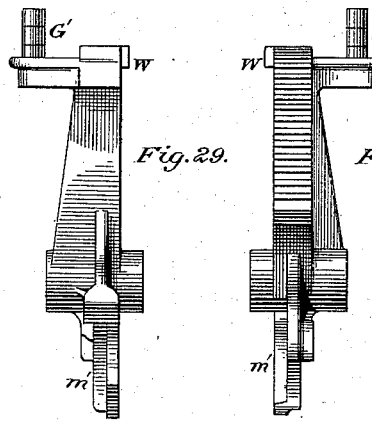
Fig. 29. Fig. 30.
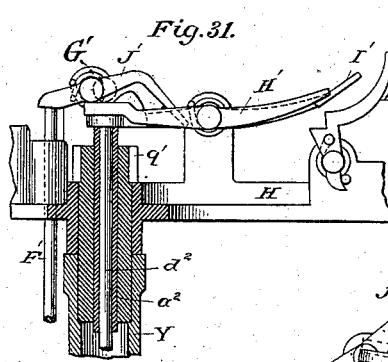
Fig. 31.
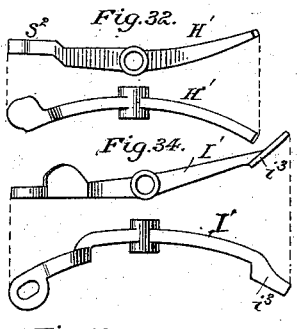
Fig. 32.
Fig. 34.
Fig. 33.
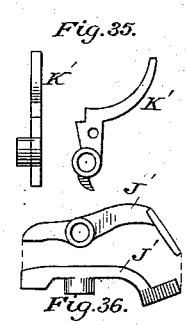
Fig. 35.
Fig. 36.
Attest:
R. F. Barnes
J. C. Turner
Inventor:
T. M. Rice
By his atty
R. D. O. Smith

UNITED STATES PATENT OFFICE.

TALLMADGE M. RICE, OF SPRINGFIELD, OHIO, ASSIGNOR TO WHITELEY, FASSLER & KELLY, OF SAME PLACE.

AUTOMATIC GRAIN-BINDER.

SPECIFICATION forming part of Letters Patent No. 267,936, dated November 21, 1882.

Application filed April 21, 1880. (Model.)

*To all whom it may concern:*

Be it known that I, TALLMADGE M. RICE, of the city of Springfield, county of Clarke, State of Ohio, have invented new and useful Improvements in Automatic Grain-Binders; and I do hereby declare that the following is a full and exact description of the same.

My invention relates to a machine for automatically separating a gavel from a flowing stream of cut grain, compressing and binding the same, and discharging the bound bundle from the machine.

The invention designed to be covered and secured in this patent has reference to the mechanism for forming and securing the knot, but does not include the neck $e^2$, with the lip $g^2$, the hook C', and the gripper A'.

That others may fully understand my invention, I will now particularly describe it, having reference to the accompanying drawings, wherein—

Figure 1:
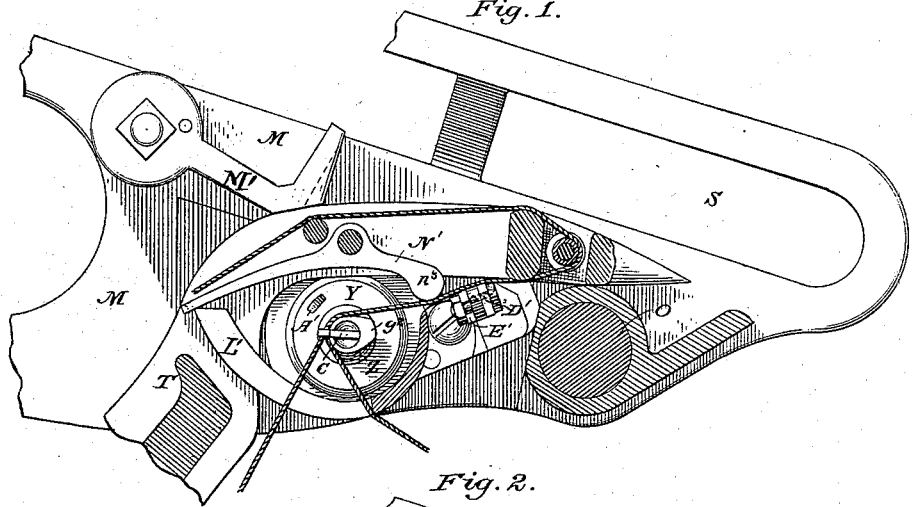
Figure 2:
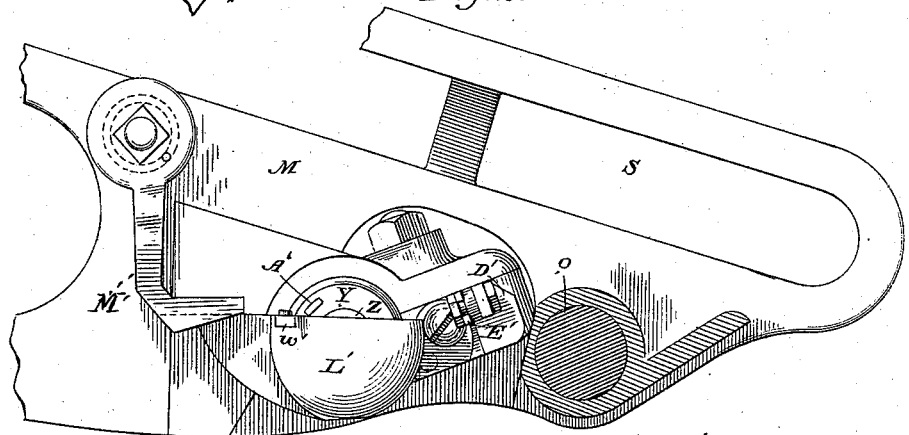
Figure 4:
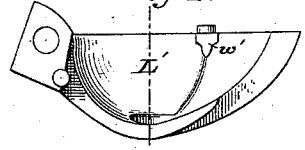
Figure 3:
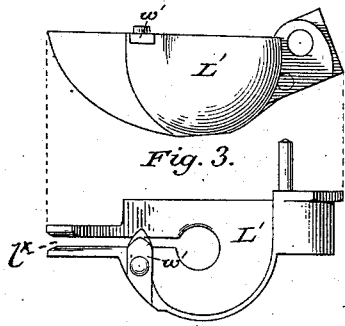
Figure 5:
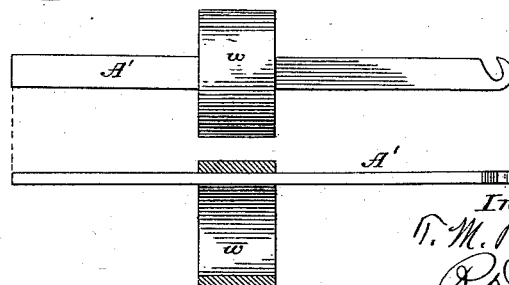

Figure 1 is an elevation showing the action of the cord-arm in placing the cord upon the knotting device. Fig. 2 is an end elevation of the knotting device, showing the cord-guide and gate. Figs. 3 and 4 represent, in elevation, plan, and section, the cord-guide. Figs. 5 to 16 are details of the cord-knotting mechanism. Figs. 17 to 26 are perspective figures, representing the formation of the knot in its successive stages. Fig. 27 is an elevation of the mechanism for driving the knotter. Figs. 28 to 36 are details of the same.

The spool for the binding-cord may be located at any convenient place on the frame, or cord may be used from core-wound balls placed in a box and situated at any convenient point.

The knotting apparatus consists of a barrel, Y, having a forward and backward rotation on its axis, and carrying with it a reciprocating core and two grippers, by one of which the ends of the cord are held after being severed, a part of the cord wound around the neck of the reciprocating core to form a loop, through which a loop of the end part is pulled by the remaining gripper to form a knot. The movements of these parts comprise rotations and reciprocations, all of which are produced by the vibration of the toothed segment W, which is actuated by cam motion derived from pins $k'$ $l'$, projecting from the back faces of wheels G and Q, respectively, or by other suitable mechanism. The barrel Y has bearings at each end in a plate on the front frame and in the bridge M, respectively. At its outer or front end it is provided with a pinion, $q'$, which meshes with the toothed segment W, and has imparted to it by said segment one revolution and a half, or thereabout, in each direction. The inner or rear end of the barrel Y has its bearing in the block $r'$, which is bolted to the bridge M. In the bearing-surface there is a groove, $s'$, which passes nearly around said bearing in a plane perpendicular to the axis of motion, and at one end it turns abruptly to a direction parallel with the axis of motion, as shown in Fig. 16. The rotation of the barrel Y is limited by the movement of the segment W. A slot, $t'$, extends half-way round the barrel Y at a point on the inner side of the groove $s'$, and is extended then obliquely outward at an angle of about forty-five degrees through a distance equal to one-fourth the circumference of the barrel at that point.

Within the barrel Y there is a short cylinder, Z, which is provided with a laterally-projecting stud, $u'$, which projects from said cylinder through the slot $t'$ into the groove $s'$. The movements of said cylinder are determined by the combined action of the slot $t'$ and groove $s'$.

Along the outside of that part of the barrel Y which is inclosed by the block $r'$ there is a longitudinal groove, $v'$, within which the bar of the gripping-hook A' is laid and has its movement. A ring, $w'$, is rigidly secured to said bar and encircles the barrel at that point, and between said ring and the bearing in said block $r'$ the spring $y'$ is placed to retract the gripping-hook A'. The bar of the gripping-hook A', at its inner end, rests upon the piston B', and the tubular piston-rod $a^2$ extends through the barrel Y and projects from its outer or forward end. A looping-gripper, C', in the axis of the barrel is laid in a groove cut longitudinally into the side of the cylinder Z and projects beyond the end of the same. The inner end of the bar of said gripper C' is provided with a cylindrical head, $b^2$. A spring, $c^2$, around the bar of said gripper, and between said head and the cylinder Z, retracts said gripper. The head $b^2$ rests upon the end of a rod, $d^2$, which passes through the tubular rod $a^2$ and projects from the outer or forward end thereof. The outer end of the cylinder Z is turned down—that is, reduced in size, as at $e^2$—to form a neck, around which the cord to be knotted may be wound; but at one side, at the outer end of said neck, a lip or flange, $g^2$, projecting laterally, is formed, and extends to the original surface of the cylinder, so that when said cylinder retreats within the end of the barrel to which it is fitted the cord which has been wound upon said neck may be carried down and confined by said flange or lip.

The cutter and holder are located by the side of the barrel Y and have their bearings in the block $r'$. The holder consists of a bar, D', placed in a groove in said block $r'$, and retracted by a spring, $h^2$, placed around said bar in a socket cored out for it in the casting. The bar D' is provided with a notch, $l^2$, into which, when the holder is pushed forward, the binding-cord is at the proper moment placed and clamped between and against the shear-plate $k^2$ and the plate $k^3$ by the retraction of the spring $h^2$. A cutting-blade, E', is rigidly secured to the holder D', with a little intervening space, and said cutter shears against the shear edge of the plate $k^2$, between the holder D' and the barrel Y. The holder-seats are freed from all lint and other accumulations by the shoulder $s^3$ on the holder D'.

The segment W is provided with a flange, $m'$, which projects in the plane of its movement beyond the axis and opposite to the toothed segment. The flange $m'$ is constructed with two circular notches, $n'$ $p'$, in its edge, and the axis of said segment is placed with reference to the wheels G Q so that said notches are alternately in the paths of the pins $k'$ $l'$. Therefore as the wheels G and Q revolve the notch $p'$ is first engaged by the pin $l'$ upon the wheel Q and rotated until in its path said pin passes out of said notch. The notch $n'$ is thereby brought into the path of the pin $k'$, whereby the segment W is returned to its first position.

The bar D', which actuates the cutter, is coupled to a rod, F', which is actuated by the lever J', soon to be described.

A stud, G', projects in a radial direction from the segment W, and when at rest, before commencing its reciprocation, said stud is directly in line with and covers the axis of the barrel Y and depresses the lever H', which rests against the rod $d^2$ and pushes the hook C' outward and beyond the end of the cylinder Z.

By the side of the lever H' the lever I' is placed, with its end resting upon the exposed end of the tubular rod $a^2$.

Outside of the levers H' and I' the lever J' is placed, with one end upon the end of the rod F', whereby the holder and cutter are actuated, and the other end in the path of the stud G'.

Each of the levers I' and J' has a retracting-spring. The first movement of the stud G' takes it off the lever H' and releases the gripper C', which immediately retires within the cylinder Z. The stud G' encounters the lever I' immediately as it releases the lever H', and the gripper A' is projected beyond the end of the barrel Y as the latter is beginning its rotation, and is immediately carried thereby into engagement with the binding-cord, which extends from the holder D' to the neck $e^2$. The stud G' remains in engagement with the lever I' only long enough to allow the rotation of the barrel to carry the hook A' over the cord, and said hook is released and the cord is gripped. At the next succeeding moment the lever J' is encountered by the stud G', which passes under the free end of the same, and thereby causes the holder and cutter to be pressed forward, admitting the new cord to the notch $l^2$, and upon its retraction confining the cord and severing it between the holder D' and the knotter, so that the band-cord remains held by the holder only. When the stud G' passes off the shoulder $s^2$ of the lever H' and permits the gripper C' to retreat, the retreat of the latter is arrested by the engagement of the free end of said lever H' with the spring-latch K', and remains so arrested until, in its reciprocation, the stud G' encounters said latch and again liberates said lever H' and permits said gripper C' to fully retreat. On the return movement of the stud G' it engages the end $i^3$ of the lever I', and, pushing the same outward, causes a quick advance of the gripper A' and the release of the ends of the band. When near the end of its movement it again encounters the levers I' and H' and causes the grippers C' and A' to be again pushed fully out and liberate the band, the knot being finished. The backward movement of the segment W and stud G' causes the barrel Y to revolve backward and the cylinder Z to advance again, and all the parts to assume the positions they had at the beginning, ready for the next operation.

Figure 17:
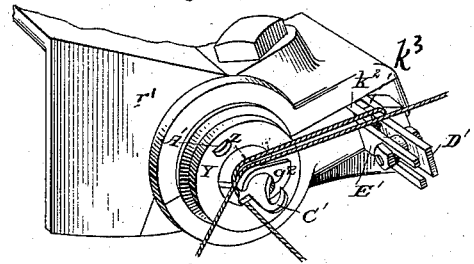
Figure 22:
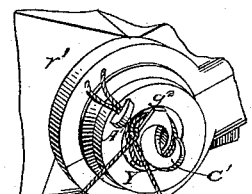
Figure 18:
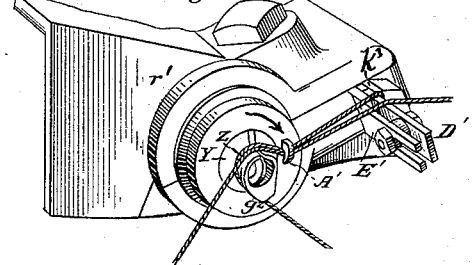
Figure 23:
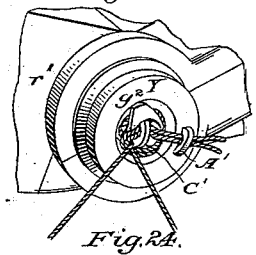
Figure 19:
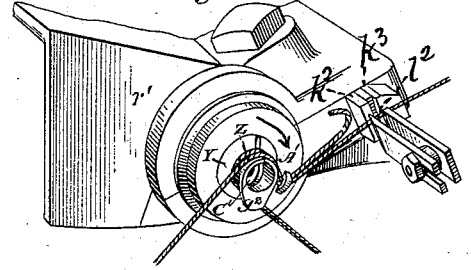
Figure 24:
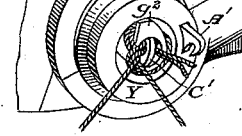
Figure 20:
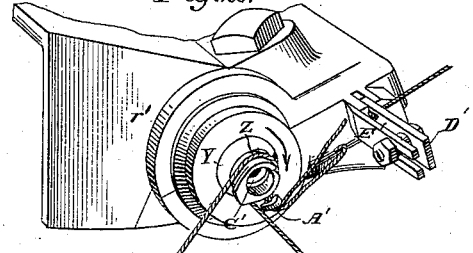
Figure 25:
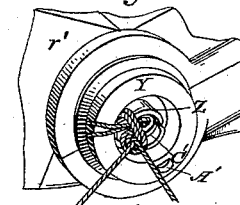
Figure 21:
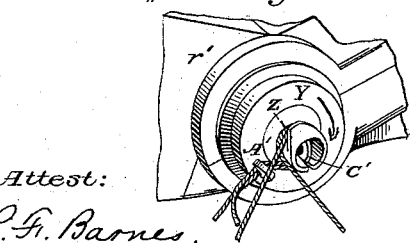
Figure 26:
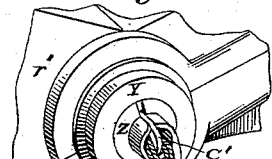

Fig. 17 represents the parts of the knotting device when the band-carrier has just completed its movement, and has laid the two ends of the band across the neck $e^2$ of the cylinder Z. At that moment one end of the band is held by the holder D' and the other end is still held by the band-carrier, but is pressed down upon the holder D' and neck $e^2$. The first movement is the beginning of the rotation of the barrel Y, the retreat of the gripper C', and the advance of the gripper A', which passes over the two parts of the cord and grips them, as shown in Fig. 18. The holder D' and cutter E' are advanced after the cord has been seized by the gripper A'. The old end is withdrawn from the holder by the rotation of the barrel, and the unsevered part drops into the notch $l^2$ and in rear of the cutter, which thereupon, when the cord is drawn from the ball sufficiently to make ends of about equal length, simultaneously grips and severs the cord for a new band, so that the ends of the cord which is around the sheaf are both held by the gripper A'. The rotation of the barrel Y continues, and when it reaches the position shown in Fig. 22 one revolution has been completed, carrying the ends under the cords and causing the cylinder to retreat and confine the cords at one point beneath the lip $g^2$, while on the opposite side the cords have been pushed off the neck $e^2$ by the shoulder $l^2$ of the hook C'. The further revolution to the position shown in Fig. 23 carries the ends over the part which is confined beneath the lip $g^2$ and into the gripper C', which is finally liberated by the engagement of the stud G' with the latch K', as before described, and the part of the cord within said hook C' is thereby drawn down, with said hook, into the cell or concavity in the end of the cylinder Z and clamped against the bottom of said cell, to hold it firmly while the knot is being formed and drawn tight. Said cell is shown by dotted lines in Figs. 7 and 10 and in perspective in Figs. 21 to 26. It will be observed that when the two ends of the band have been gripped by the gripper A' and the same is moved around its axis of revolution the band is wound upon the neck $e^2$ and is tightened around the bundle in a degree corresponding with the length of cord so wound upon said neck. The proper tightness of the band is thereby secured without the employment of any strong take-up to withdraw the cord before the ends are secured. If, for any reason, the band around the bundle cannot spare the cord necessary to wind around the neck $e^2$, then the necessary quantity will be supplied by withdrawal through the gripper A', the spring $y'$ whereof becomes the real measure of the band-tension. It will be observed, also, that because the neck $e^2$ revolves with the gripper A' the increasing strain upon the band is distributed over the surface of contact with said neck, and does not increase the strain at the point where the cord is held by the gripper A', and therefore there is no increased liability to break the cord at that point. The backward revolution of the barrel Y then commences. The cylinder Z advances so as to discharge the cord from the lip $g^2$ over the loop held by the gripper C', as shown in Fig. 25. The strain of the discharger upon the bundle and expansion and weight of the bundle combine to draw the knot tight, and at the last moment the gripper C' is advanced and its loop is liberated and the bundle discharged.

To prevent the knotter from becoming entangled with the straws or the binding-cord, a cup-shaped shield-plate, L', is placed in front of the same, being attached at its outer end only to the bridge-piece M.

It is necessary to guide the cord properly to the tying devices, and to prevent any accidental swaying of the bundle to displace it before being secured thereby. The shield-plate is therefore formed as follows: Along its inner portion it presents two projecting lips or plates, forming a narrow mouth or slit, $l^x$, for the entrance of the cord. At its bottom the slit is enlarged so as to permit the knot to pass freely out.

The projecting ends of the two parts or plates which form the cord-guide extend forward almost to the path of the point of the cord-carrier, so that the eye of the carrier passes directly in front of the opening between said plates and delivers the cord unfailingly to said guide. After having entered the guide no pressure or tension upon the cord from below the guide can draw it out of the proper plane.

In front of the cord-guide L' there is a swinging gate, M', which closes down upon the mouth of said cord-guide and aids in preventing the entrance of straw to the knotter. The cord-arm T pushes this gate upward as it passes over the tyer, and the cord is thereby confined in the grooved upper surface of the arm while in position above the tyer.

At the inner termination of the mouth or slit $l^x$ in the shield-plate L' there is a short finger or spur, $w'$, which projects across said mouth or slit, but not so as to prevent the entrance of the cord, which may move aside in passing the same. The finger or spur $w'$ is bent downward at the point, and is sharpened at the inner side, so as to break or sever the cord if drawn across it. The object of it is to hold the cord when, through accident or otherwise, the binder is operated without a bundle and takes off a short band. The tension on the cord prevents the arm from drawing away any cord not required to encircle the bundle. Hence, if for any reason the arm advances without inclosing any bundle, the cord-arm will simply traverse the cord without drawing from the spool any material quantity. The frictional resistance of the arm moving over the cord will, however, cause the cord to stretch slightly behind the arm and produce a slackness of the cord in front of it. This slack portion of the cord will be brought in contact with the neck $e^2$, and is liable to be caught by the grippers A' and C' and wound up in a tangle as the knotter revolves. This tangle is liable to jam and clog the parts, because, being cut clear of the spool part of the cord by the regular action of the cutter, there will be no force to cause it to be discharged from the knotter, and its presence will impede or prevent the proper action of the knotter subsequently. The sharp-edged hook or spur $w'$ prevents this result in this way. In the normal action of the machine the cord from its gripped end passes over the neck, downward through the guide, outward around the bundle, and upward and outward again along the under side of the arm. By the movement of the arm the returning part of the cord is now carried into the slit of the guide and brought upon the upper or sloping back of the hook $w'$ with a downward movement and slips over it without impediment; but when the arm moves upward and outward without a bundle the cord, from one end of said movement to the other, simply draws in nearly a straight line from the neck $e^2$ to the eye in the end of the arm, and as the point of the arm passes up over the entrance to the slotted guide the cord will be brought up under the hook $w'$, and the further advance of the arm will simply double the cord over said hook, and it will then be laid upon the neck $e^2$ and in the grippers in the regular way under tension, as though a bundle was in the loop instead of the hook. The cord being gripped and cut off in the regular way, the revolution of the neck $e^2$ will draw the loop so tightly over the unyielding hook $w'$ that the loop will be severed; but the knot will nevertheless be formed and discharged as though a bundle had been bound, and without any possibility of entanglement from an irregular manner of presenting the cord, such as would take place were there no hook $w'$. The cutting of the band is not a necessity to prevent tangling the cord, but it renders its disengagement from hook $w'$ sure.

The device shown and designated by letter N' is not claimed herein, because the same device is described and claimed in another application of mine filed of even date herewith.

Having described my invention, what I claim as new is—

1. The barrel Y, with grippers A' and C', each provided with a retracting-spring and terminating within said barrel, combined with a piston, B', having a tubular rod, $a^2$, and a piston, $b^2$, having its rod $d^2$ inserted through the tubular rod $a^2$, and both protruding from the outer end of said barrel, as set forth.

2. The barrel Y, with grippers A' and C', cylinder Z, and pistons B' and $b^2$, with their respective rods concentric to the axis of said barrel, as set forth, and a pinion, $q'$, on the outer end of said barrel Y, combined with a vibrating segment-rack, W, whereby said barrel is rotated, and automatic levers actuated by a pin carried by said rack, whereby said pistons are actuated at the proper moments.

3. The barrel Y, provided with grippers A' and C', with their respective pistons protruding beyond the outer end of said barrel, as described, combined with a vibrating segment-rack, W, armed with a stud, G', and the levers H' and I', whereby said barrel is rotated and said pistons actuated, as set forth.

4. The gripper C' and its piston and rod $b^2$ $d^2$, combined with the lever H', stud G', and latch K', whereby said gripper has its retracting movement divided into two stages and its advance quickly performed in one step, as and for the purposes set forth.

5. The barrel Y, which carries the knotting devices, provided with a pinion, $q'$, and the segment-rack W, provided with the flange $m'$, and notches $p'$ and $n'$, combined with the wheels G and Q, in mesh with each other, and armed respectively with the studs $k'$ and $l'$, which successively engage with said notches, and thereby actuate said segment in its vibrations, as set forth.

6. The horizontal rotating knotter Y, mounted above the receptacle and bundle to be bound, combined with a cup-shaped cord guide and shield, L', located in front of and in line with said knotter.

7. A cup-shaped slotted cord guide and shield, L', placed before the knotter, combined with a pivoted gate, M', which swings across the path of the cord-carrier and closes the upper entrance to said guide, except when said gate is raised by the point of the cord-carrying arm, as set forth.

8. The slotted cord-guide L', placed in front of the knotter for the purpose set forth, combined with the hook $w'$, for the purpose of catching a short band and severing the loop of the cord when, from whatever cause, the mechanism is operated without a bundle.

9. The cylinder Z, provided with the cylindrical neck $e^2$, an axial concavity or cell, and a longitudinal slot, combined with a looping-hook, C', capable of a longitudinal reciprocation in said cell and slot, and mechanism to actuate the same, whereby the loop of the band material is seized, drawn down into said cell, and gripped against the bottom of the same while the knot is being completed, as set forth.

10. The vibrating segment-rack W, armed with the stud G', combined with the levers I', H', and J', whereby the barrel is rotated and the grippers A' C' and the holder and cutter D' E' are successively actuated at proper intervals by the movement of said stud G'.

T. M. RICE.

In presence of—
E. H. BARNES,
A. N. SUMMERS.